US008195874B2

(12) United States Patent
Sato

(10) Patent No.: US 8,195,874 B2
(45) Date of Patent: Jun. 5, 2012

(54) STORAGE APPARATUS AND METHOD FOR SHREDDING STORAGE MEDIUM

(75) Inventor: Hajime Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 12/526,623

(22) PCT Filed: Apr. 10, 2009

(86) PCT No.: PCT/JP2009/001675
§ 371 (c)(1),
(2), (4) Date: Aug. 10, 2009

(87) PCT Pub. No.: WO2010/116419
PCT Pub. Date: Oct. 14, 2010

(65) Prior Publication Data
US 2011/0258411 A1 Oct. 20, 2011

(51) Int. Cl.
G06F 12/02 (2006.01)
(52) U.S. Cl. .............................. 711/112; 711/E12.001
(58) Field of Classification Search .................... None
See application file for complete search history.

(56) References Cited

U.S. PATENT DOCUMENTS

| 7,809,880 | B2 * | 10/2010 | Forbis et al. | 711/111 |
|---|---|---|---|---|
| 2002/0181134 | A1 | 12/2002 | Bunker et al. | |
| 2008/0201544 | A1 | 8/2008 | Nakajima et al. | |
| 2009/0077300 | A1 * | 3/2009 | Forbis et al. | 711/4 |

FOREIGN PATENT DOCUMENTS

| JP | 2008-198049 | 8/2008 |
|---|---|---|
| WO | WO 2006/062511 | 6/2006 |
| WO | WO 2007/044250 | 4/2007 |
| WO | WO 2008/070173 | 6/2008 |

OTHER PUBLICATIONS

International Search Report in International Application No. PCT/JP2009/001675 Nov. 30, 2009.
Written Opinion of the International Searching Authority in International Application No. PCT/JP2009/001675 Nov. 30, 2009.

* cited by examiner

Primary Examiner — Kevin Verbrugge
(74) Attorney, Agent, or Firm — Brundidge & Stanger, P.C.

(57) ABSTRACT

Provided is a storage apparatus 10 including a communication I/F 11, a control processor 12, a drive controller 13, and a cache memory 14, which manages a drive write request to write data to a storage drive 171 in a write process wait queue 1500, reads the drive write request registered on the write process wait queue 1500, and writes the data to the storage drive 171 in accordance with the drive write request read from the write process wait queue 1500. The storage apparatus 10 includes the functions of: generating erase data as data to be written in order to shred the storage drive 171, and storing the generated erase data in the cache memory 14; and generating a plurality of erase data write requests to write the erase data, intended for the different storage drives 171, respectively, and registering the generated erase data write requests into the write process wait queue 1500.

15 Claims, 19 Drawing Sheets

[Fig. 1]
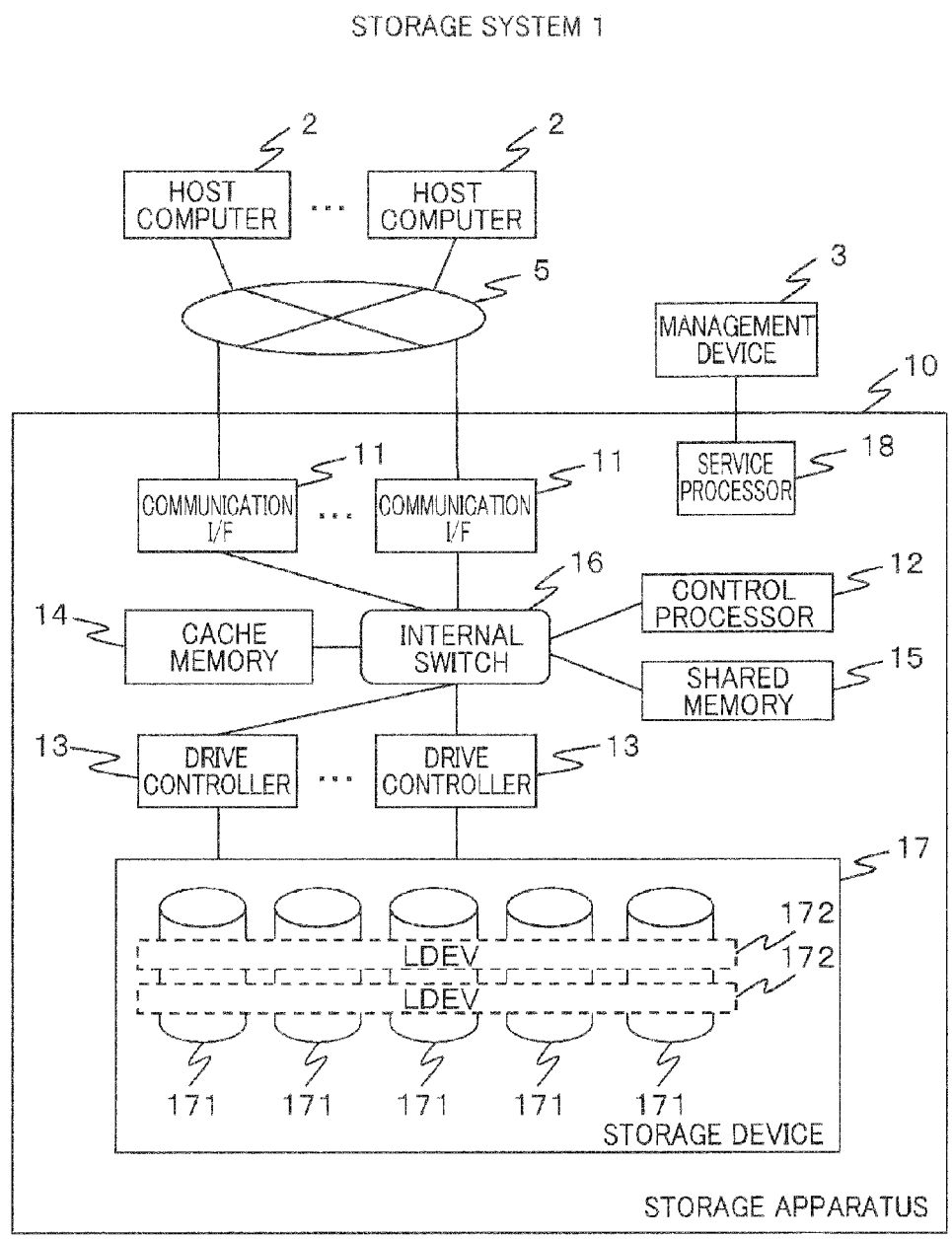

[Fig. 2A]
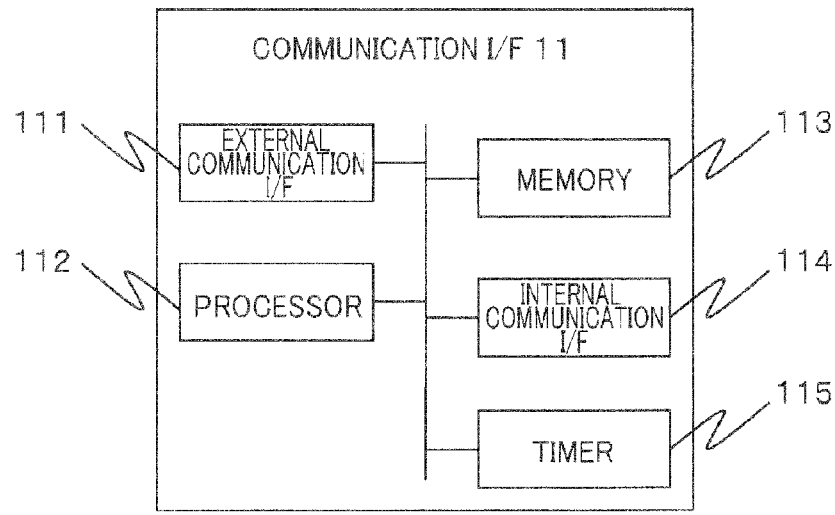
[Fig. 2B]
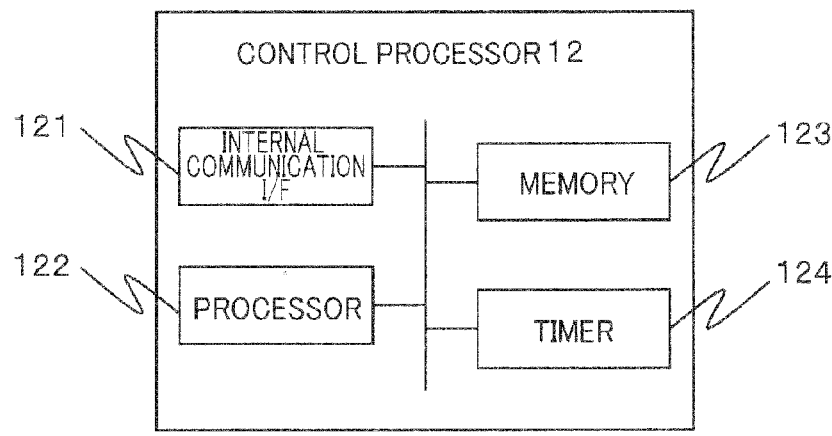
[Fig. 2C]
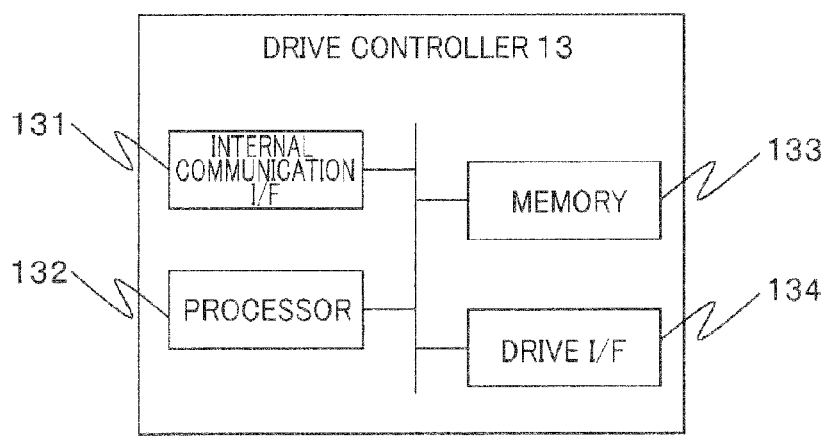

[Fig. 3]
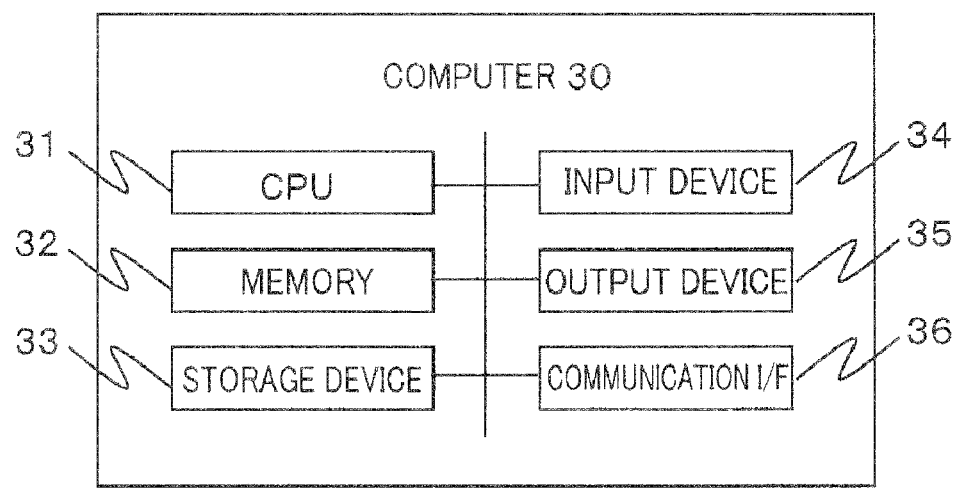

[Fig. 4]
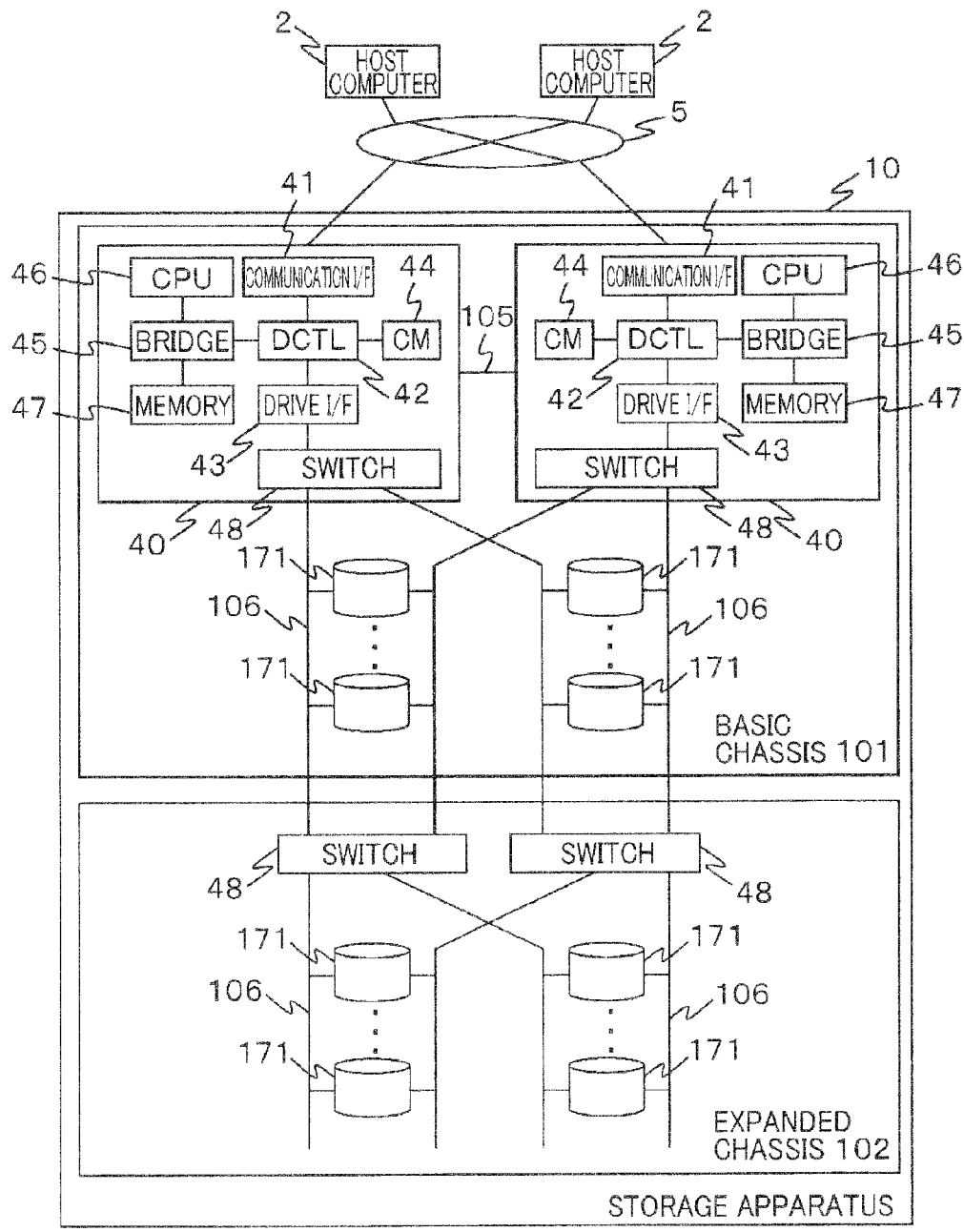

[Fig. 5]
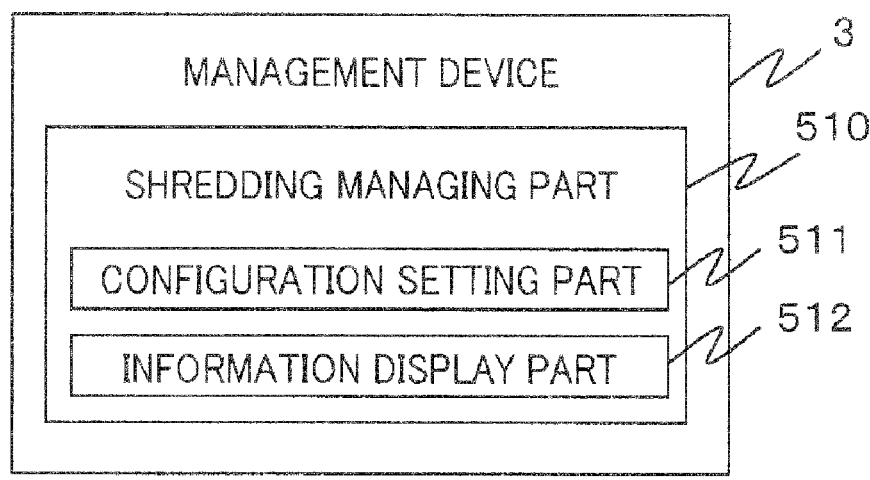

[Fig. 6]
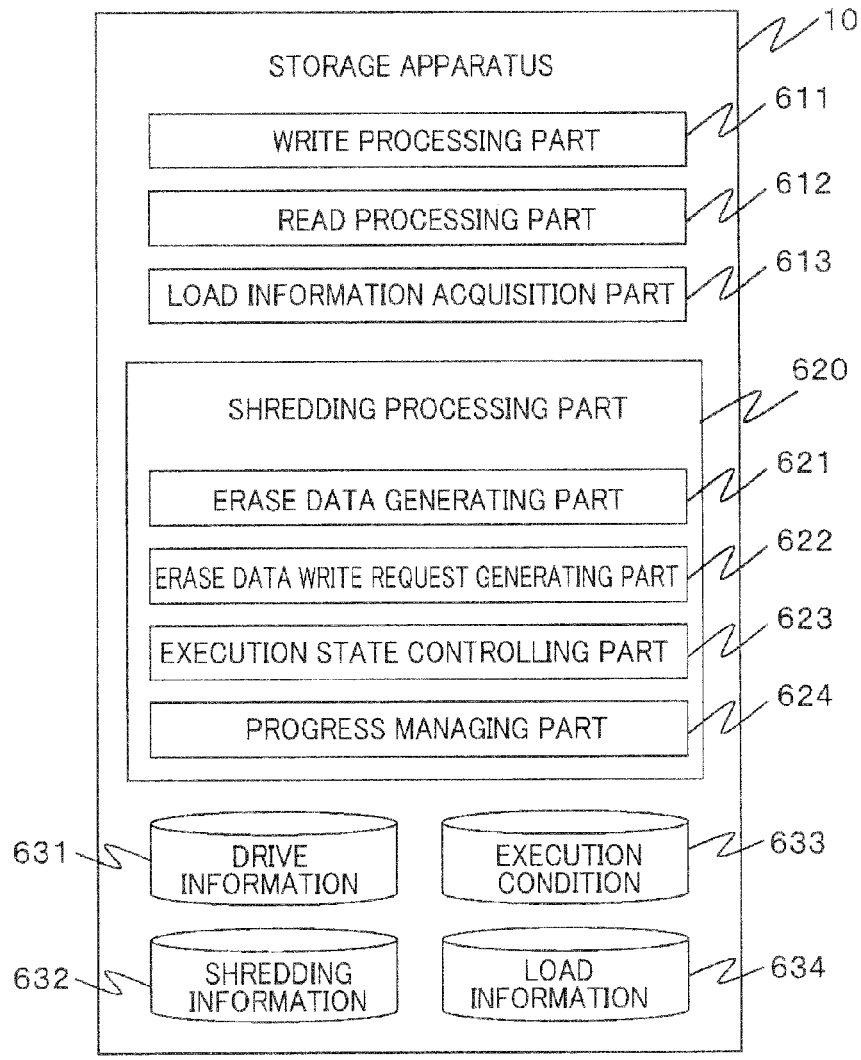
[Fig. 7]
DRIVE WRITE REQUEST 700
| ... | DRIVE ID | WRITE DESTINATION ADDRESS | DATA LENGTH | CACHE STORAGE POSITION | ... |
|---|---|---|---|---|---|
| | 711 | 712 | 713 | 714 | |

[Fig. 8A]

LOAD INFORMATION TABLE 634

| PROCESSOR UTILIZATION 6341 ||| REMAINING CAPACITY OF CACHE MEMORY 6342 | POWER CONSUMPTION 6343 |
|---|---|---|---|---|
| COMMUNICATION I/F | CONTROL PROCESSOR | DRIVE CONTROLLER | | |
| 15% | 23% | 10% | 50% | 1.2kW |

[Fig. 8B]

EXECUTION CONDITION TABLE 633

| (UPPER) THRESHOLD OF PROCESSOR UTILIZATION 6331 ||| THRESHOLD OF REMAINING CAPACITY OF CACHE MEMORY 6332 | (UPPER) THRESHOLD OF POWER CONSUMPTION 6333 |
|---|---|---|---|---|
| COMMUNICATION I/F | CONTROL PROCESSOR | DRIVE CONTROLLER | | |
| 50% | 40% | 30% | 20% | 1.2kW |

| EXECUTION INHIBITION TIME PERIOD 6334 |
|---|
| 09:00−15:00 |
| 00:00−06:00 |

[Fig. 9]

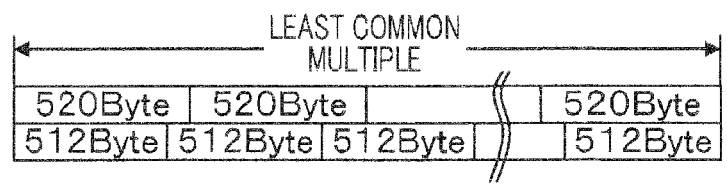

WHEN TARGET DRIVE IS ONLY SCSI, FC, SAS OR OTHER TYPE, WITH A SECTOR LENGTH OF 520 BYTES — 520Byte WHEN TARGET DRIVE IS ONLY PATA, SATA OR OTHER TYPE, WITH A SECTOR LENGTH OF 512 BYTES — 512Byte

WHEN TARGET DRIVES OF DIFFERENT SECTOR LENGTHS COEXIST

| ← | LEAST COMMON MULTIPLE | | → |
|---|---|---|---|
| 520Byte | 520Byte | ⋯ | 520Byte |
| 512Byte | 512Byte | 512Byte ⋯ | 512Byte |

[Fig. 10]

DRIVE INFORMATION TABLE   631

| 6311 | 6312 | 6313 | 6314 | |
|---|---|---|---|---|
| DRIVE ID | DRIVE TYPE | SECTOR LENGTH | CAPACITY | ⋯ |
| DISK#1 | SAS | 520Byte | 512GByte | ⋯ |
| DISK#2 | SATA | 512Byte | 1TByte | ⋯ |
| DISK#3 | SAS | 520Byte | 256GByte | ⋯ |
| DISK#4 | PATA | 512Byte | 256GByte | ⋯ |
| DISK#5 | FC | 520Byte | 512GByte | ⋯ |
| ⋮ | ⋮ | ⋮ | ⋮ | ⋮ |

[Fig. 11]
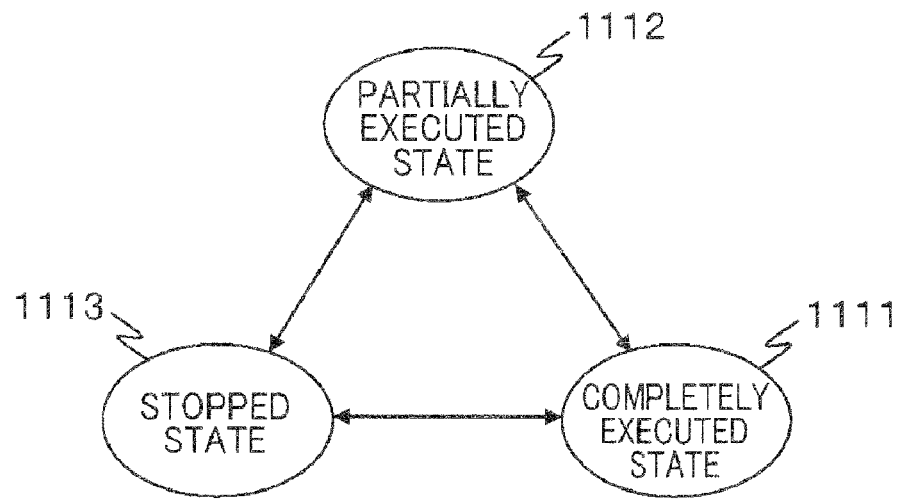

[Fig. 12]

SHREDDING INFORMATION TABLE 632

| DRIVE ID 6321 | START TIME 6322 | STATUS 6323 | ERROR INFORMATION 6324 | FINISH TIME 6325 | ... |
|---|---|---|---|---|---|
| DISK#1 | 2009/02/25 21:30 | 30% | 1024h, 1048h, ... | — | ... |
| DISK#2 | 2009/02/25 21:30 | 25% | | — | ... |
| DISK#3 | 2009/02/25 19:30 | 50% | | — | ... |
| DISK#4 | 2009/02/25 16:30 | 70% | | | ... |
| DISK#5 | 2009/02/25 15:30 | 100% | | 2009/02/25 21:07 | ... |
| ... | ... | ... | ... | ... | ... |

[Fig. 13]
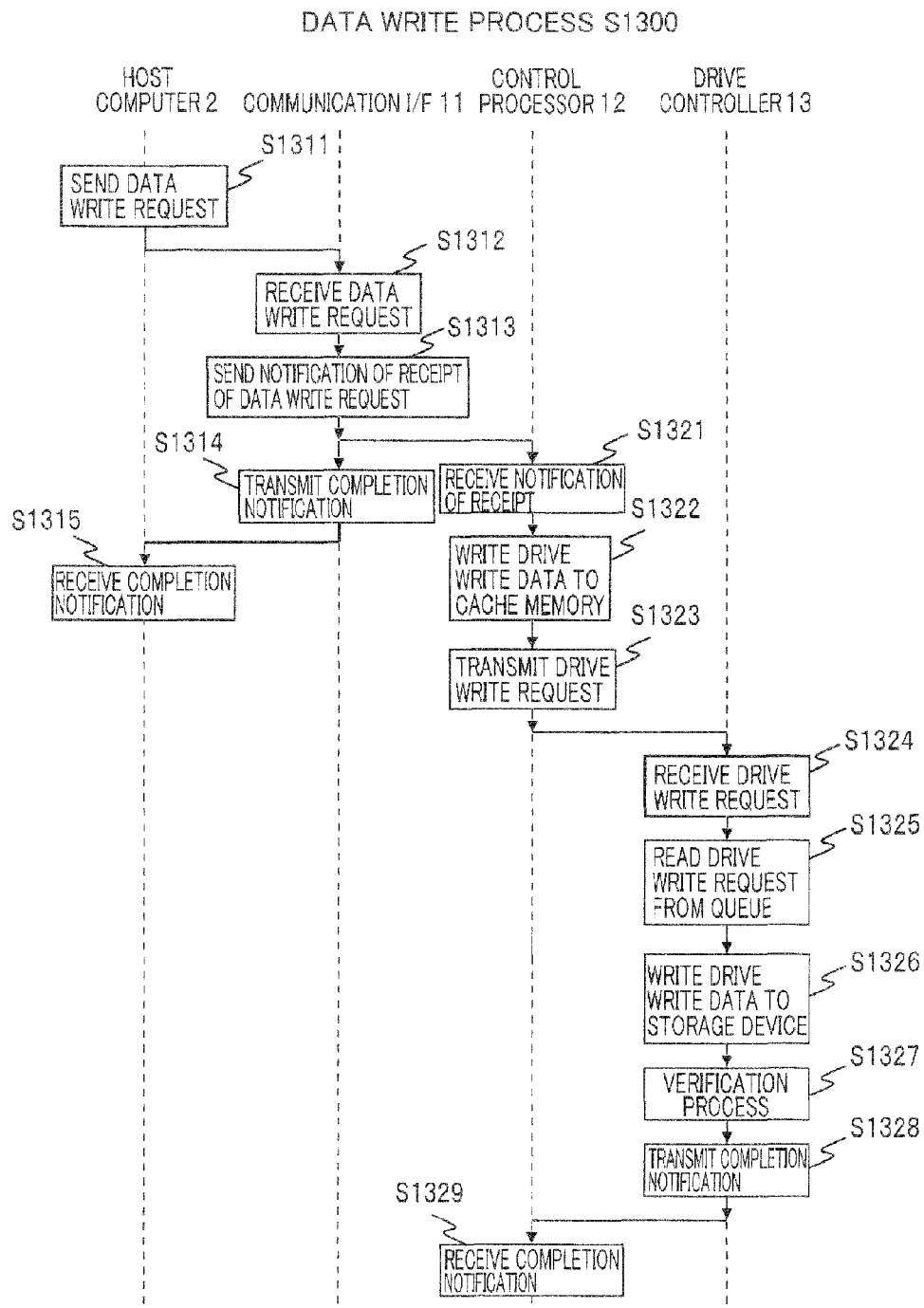

[Fig. 14]
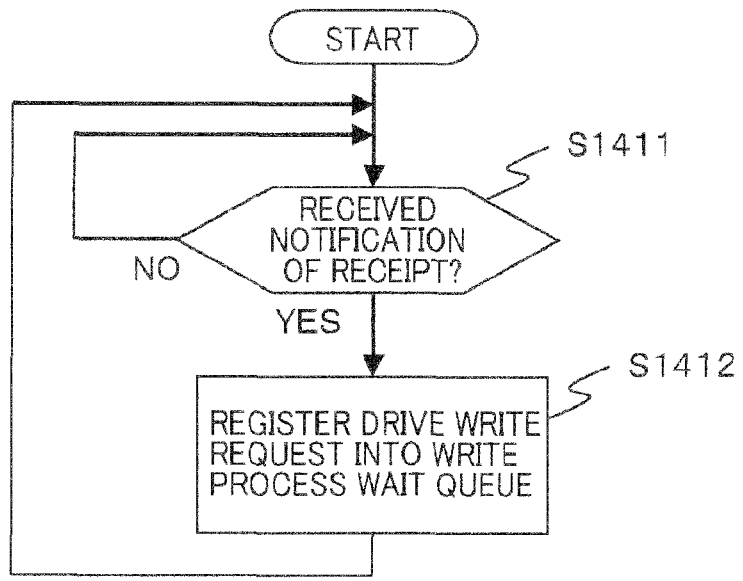
[Fig. 15]
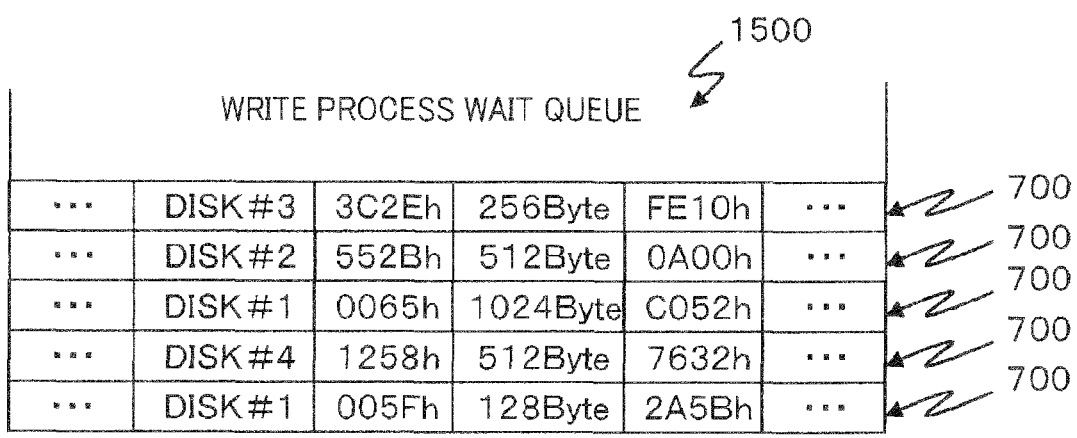

[Fig. 16]
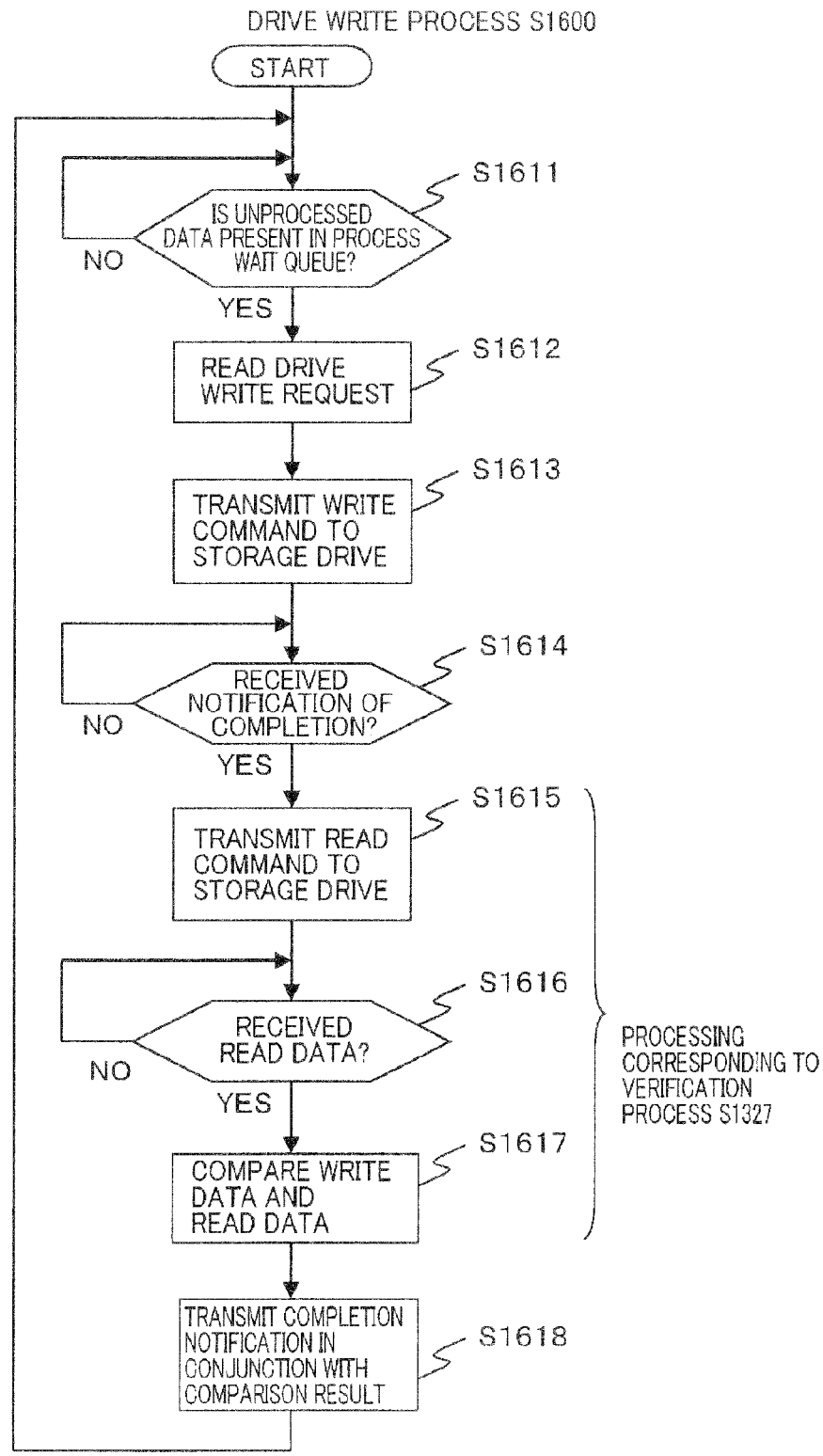

[Fig. 17]
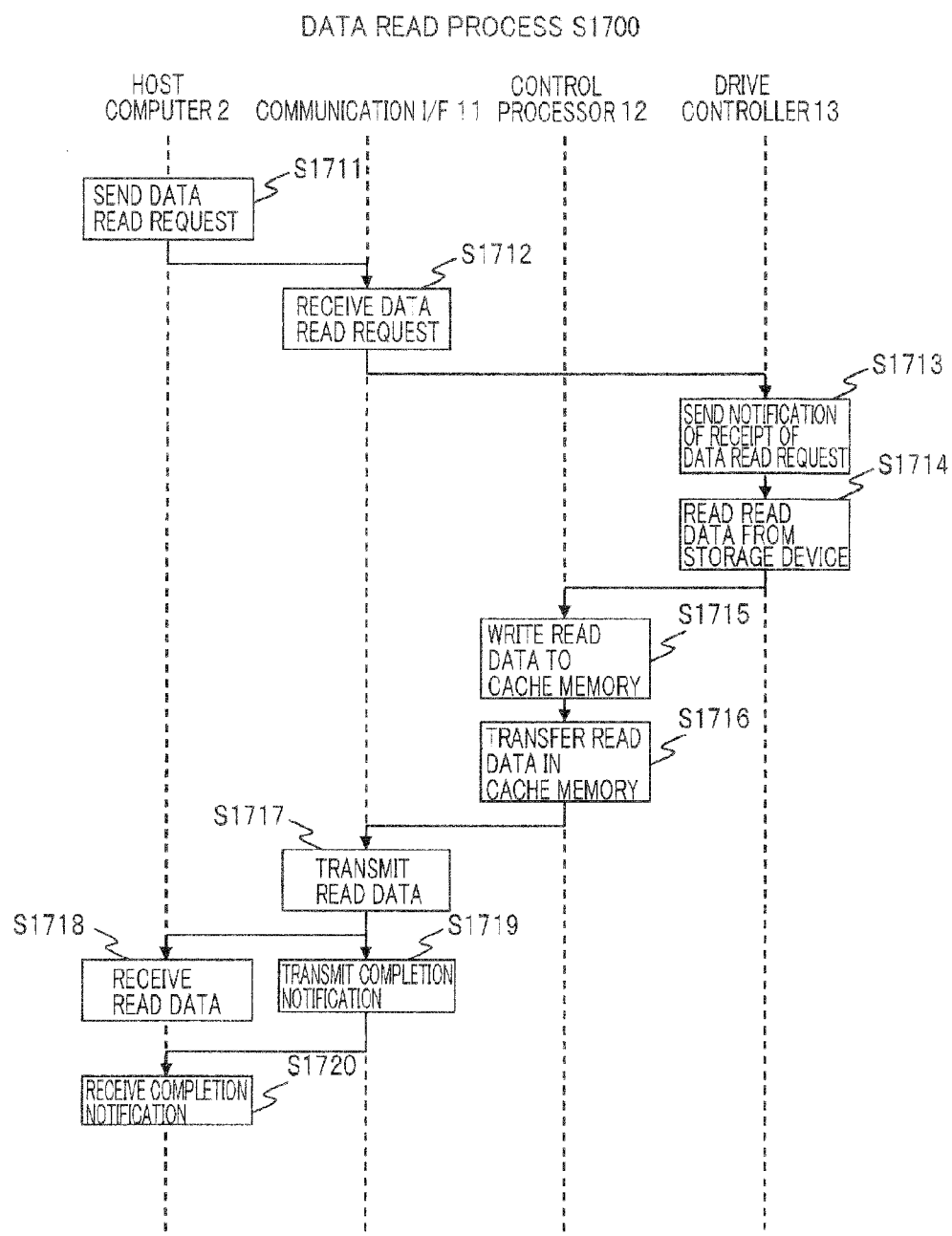

[Fig. 18A]
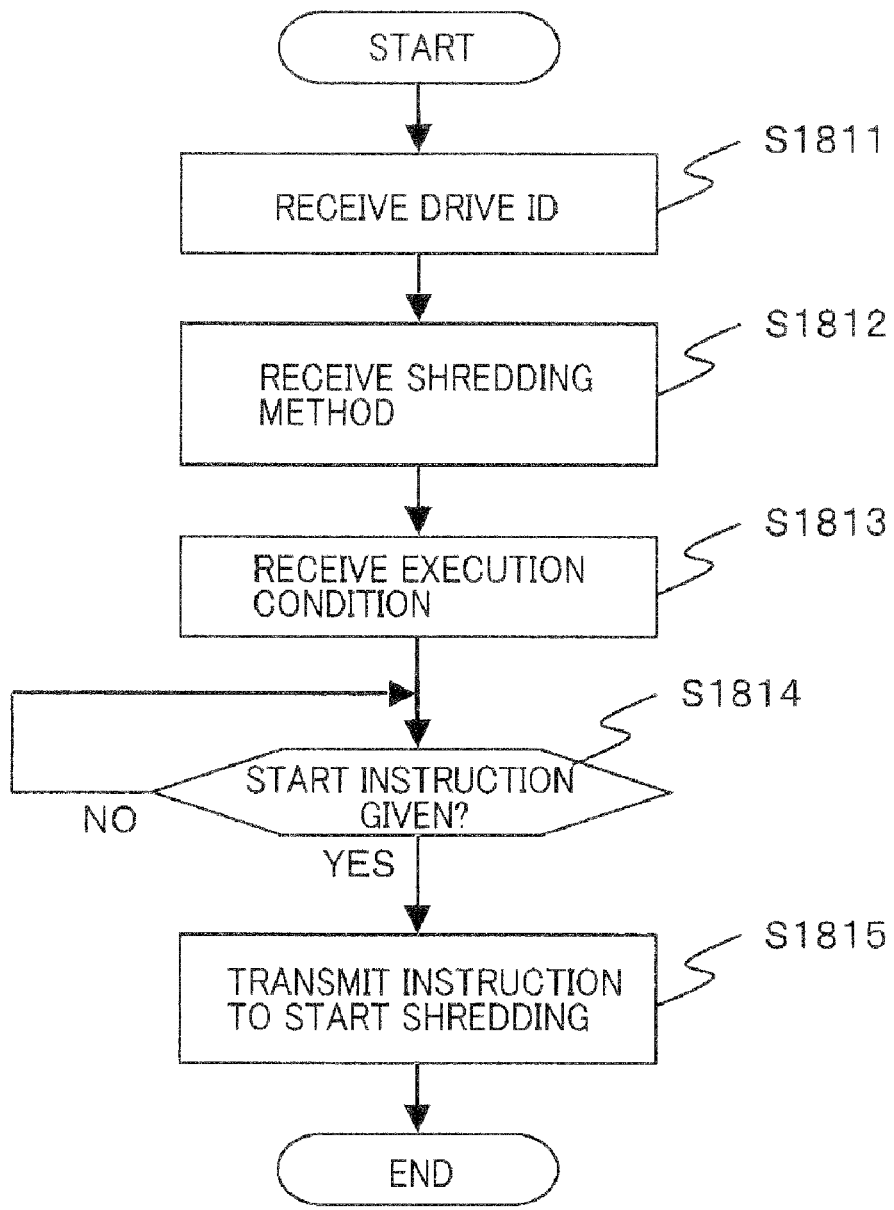

[Fig. 18B]

```
                                                                    1850
┌─────────────────────────────────────────────────────────────┐
│                 CONFIGURATION SETTING SCREEN                │
├─────────────────────────────────┬───────────────────────────┤
│                                 │   SHREDDING EXECUTION     │
│   SPECIFY TARGET DRIVE          │        CONDITION          │
│                                 │  THRESHOLD OF    THRESHOLD OF
│      ┌────────┬─┐               │ PROCESSOR UTILIZATION  REMAINING CAPACITY
│      │ DISK#1 │△│               │                      OF CACHE MEMORY
│      ├────────┤ │               │ COMMUNICATION I/F  50%
│      │ DISK#2 │ │               │ CONTROL PROCESSOR  40%      20%
│      ├────────┤ │               │ DRIVE CONTROLLER   30%
│      │ DISK#3 │ │               │
│      ├────────┤ │               │    THRESHOLD OF    SHREDDING EXECUTION
│      │        │▽│               │  POWER CONSUMPTION  INHIBITION TIME PERIOD
│      └────────┴─┘               │        2kW         ┌─────────────┬─┐
│ ─ ─ ─ ─ ─ ─ ─ ─ ─ ─ ─ ─ ─ ─ ─ ─ │                    │ 09:00-15:00 │△│
│   SHREDDING METHOD              │                    ├─────────────┤ │
│                                 │                    │ 00:00-06:00 │ │
│   ┌──────────────┐              │                    ├─────────────┤ │
│   │ DoD 5520-22.M│▽             │                    │             │ │
│   └──────────────┘              │                    ├─────────────┤ │
│                                 │                    │             │▽│
│                                 │                    └─────────────┴─┘
│                                 │      ┌───────┐    ┌───────┐
│                                 │      │ START │    │ CLOSE │
│                                 │      └───────┘    └───────┘
└─────────────────────────────────┴───────────────────────────┘
```

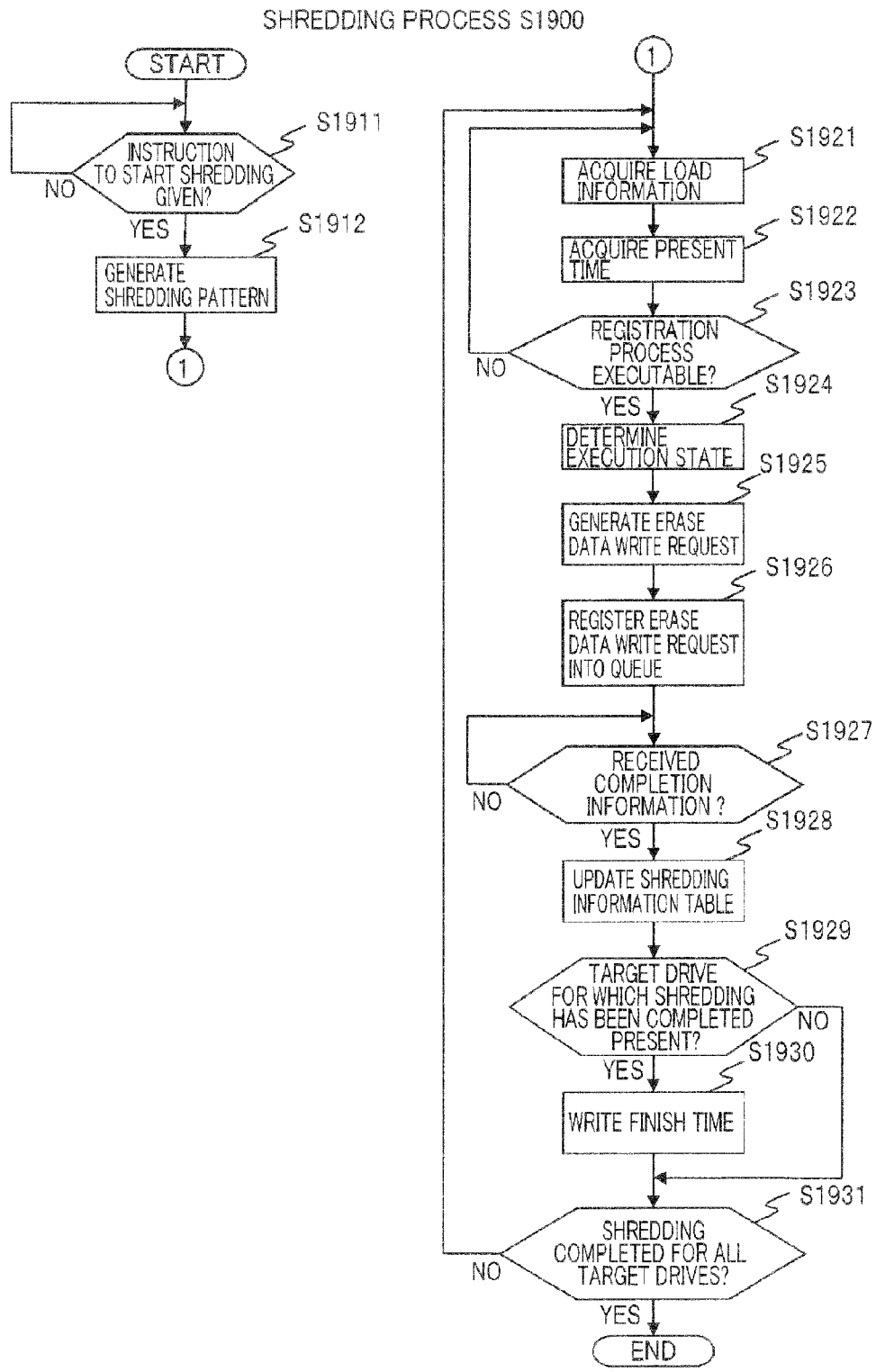

[Fig. 20A]
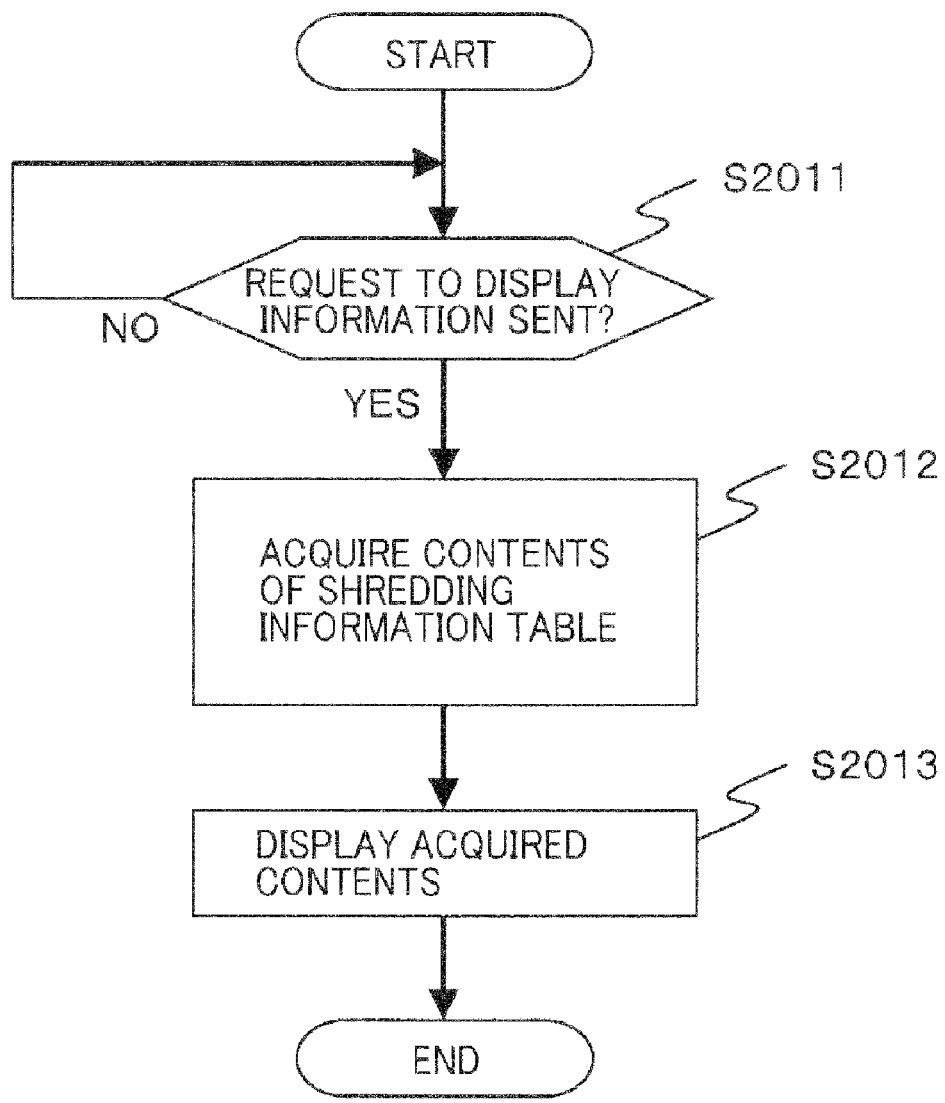

[Fig. 20B]

INFORMATION DISPLAY SCREEN — 2050

| DRIVE ID 2051 | START TIME 2052 | PROGRESS 2053 | EXPECTED FINISH TIME 2054 | ERROR INFORMATION 2055 | FINISH TIME 2056 |
|---|---|---|---|---|---|
| DISK #1 | 2009/02/25 21:30 | 30% | 2009/02/26 00:30 | 1024h 1048h | — |
| DISK #2 | 2009/02/25 21:30 | 25% | 2009/02/26 01:30 | | — |
| DISK #3 | 2009/02/25 19:30 | 50% | 2009/02/25 23:30 | | — |
| DISK #4 | 2009/02/25 16:30 | 70% | 2009/02/25 22:30 | | |
| DISK #5 | 2009/02/25 15:30 | 100% | | | 2009/02/25 21:07 |
| ... | ... | ... | | ... | ... |

[START] [CLOSE]

STORAGE APPARATUS AND METHOD FOR SHREDDING STORAGE MEDIUM

TECHNICAL FIELD

The present invention relates to a storage apparatus and a method for shredding a storage medium, and more particularly to technique for enabling efficient shredding of a storage medium for use in a storage apparatus.

BACKGROUND ART

In a situation such as reallocation of a hard disk drive provided for one user to another user, a data center or the like in which a disk array device is in operation, for example, needs to perform a process of completely erasing data in a storage device (hereinafter referred to as "shredding") from a security standpoint, such as in view of leakage of information.

Regarding the shredding, Patent Document 1, for example, discloses the following approach for enabling a host computer or the like to make quick use of a volume targeted for erasure. In this approach, upon receipt of an erase operation request to erase data stored in a storage unit from the host computer, a storage controller detects a logical storage area that can be allocated but different from a logical storage area allocated to the storage unit. The storage controller then allocates the detected logical storage area to the storage unit, and sends, to the host computer as the request source, notification that the storage unit is accessible. Thereafter, the storage controller performs erasing of the data in the logical storage area corresponding to the storage unit targeted for erasure.

CITATION LIST

Patent Literature

PTL 1: Japanese Patent Application Laid-open Publication No. 2008-198049

SUMMARY OF INVENTION

Technical Problem

Recently, a storage medium for use in a storage apparatus is becoming increasingly larger in capacity. Moreover, a hard disk drive for use in business applications that demand a high level of security or confidentiality, such as banking or securities trading business applications, requires high-level shredding that involves time-consuming shredding, examples of such are the NSA (National Security Agency) method, the Peter Gutmann method, the German BSI (German Information Security Agency) method, or the like. Therefore, a data center or the like is faced with the issue of reducing processing time for the shredding of many hard disk drives.

The present invention has been made in consideration for the background as above described. And an object of the present invention is to provide a storage apparatus and a method for shredding a storage medium, capable of efficient shredding of the storage medium for use in the storage apparatus.

Solution to Problem

In order to attain the above object, one aspect of the present invention is a storage apparatus comprising a communication I/F that receives a data I/O request sent from an external apparatus; a storage medium controller that performs any one of writing and reading of data to and from a storage device configured to include a plurality of storage media, in response to the received data I/O request, a cache memory that stores any one of write data to be written to the storage device and read data read from the storage device, a control processor that serves for data transfer performed between at least one to another of the communication I/F, the storage medium controller, and the cache memory, an erase data generating part, and an erase data write request generating part, wherein the storage medium controller manages in a process wait queue a storage medium write request as a request to write the write data to the storage medium, reads the storage medium write request registered on the process wait queue, and writes the data to the storage medium in accordance with the storage medium write request that is read, the erase data generating part generates erase data as data to be written to the storage medium in order to shred the storage medium, and stores the generated erase data in the cache memory, and the erase data write request generating part generates a plurality of the storage medium write requests to write the erase data to the storage media, intended for the different storage media, respectively, and registers the generated storage medium write requests into the process wait queue.

According to the present invention, the plurality of storage medium write requests intended for the different storage media, respectively, generated by the erase data write request generating part, are registered into the process wait queue for a typical data write request thereby to perform processing. This enables concurrent (or time-division multiplex based) shredding of the different storage media, and thus enables efficient shredding of the plurality of hard disk drives.

Another aspect of the present invention is the storage apparatus, wherein the erase data write request generating part uses in common the same erase data stored in the cache memory, to generate the plurality of storage medium write requests.

According to the present invention, the erase data write request generating part uses in common the same erase data stored in the cache memory, to generate the storage medium write requests. Thus, even if the plurality of storage medium write requests intended for the different storage media, respectively, are generated for the concurrent shredding, the erase data generator generates the common erase data alone for use, which in turn enables suppression of erase data generation load for the shredding. Also, low utilization of the cache memory enables a lessening of the influence on normal operation the processing of the data I/O request received from the external apparatus).

Still another aspect of the present invention is the storage apparatus, wherein the erase data generating part generates the erase data having a data length equal to any one of a least common multiple of sector lengths of the respective storage media and an integral multiple of the least common multiple to store in the cache memory, when the plurality of storage medium write requests to be generated by the erase data write request generating part includes a mixture of the requests intended for the storage media of different sector lengths.

According to the present invention, even for the concurrent shredding in storage devices having different sector lengths, the same erase data stored in the cache memory can be used in common to generate a plurality of erase data write requests.

A further aspect of the present invention is the storage apparatus, wherein the storage medium controller further includes a verification function that involves writing first data stored in the cache memory to the storage medium in response to the storage medium write request, and thereafter, reading second data from a write target for the storage medium write request, and comparing the second data to the first data, thereby determining whether or not a write process has been properly performed.

According to the present invention, the storage medium controller can verify whether or not the writing of data has been correctly performed for the storage medium write request. Also, a configuration of the present invention can be easily realized by using the verification function included as a standard function in an existing disk array device.

A further aspect of the present invention is the storage apparatus, comprising a load information acquisition unit that acquires information on load on the storage apparatus, and an execution state controller that controls the number of storage medium write requests registered into the process wait queue by the erase data write request generator, depending on the acquired information.

According to the present invention, the registration of the storage medium write request to write the erase data into the process wait queue can be restricted, depending on the load on the storage apparatus. This enables control such that the execution of the process for the shredding is restricted when the load on the storage apparatus is high, while the process for the shredding is actively performed when the load on the storage apparatus is low, which in turn enables achieving effective use of the storage apparatus. Incidentally, the load on the storage apparatus referred to by the present invention is, for example, a utilization of a processor of the storage apparatus, remaining capacity of the cache memory, power consumption by the storage apparatus, or the like.

A further aspect of the present invention is the storage apparatus, wherein the erase data write request generating part further includes an execution state controlling part that manages a schedule of execution of a process for registering the storage medium write request, and executes the registration process according to the schedule.

According to the present invention, the process for registering the storage medium write request on the process wait queue can be controlled according to the preset schedule. This enables the shredding to be performed, avoid time during which the load on the storage apparatus becomes high, such as for example online job time during the day or batch job time during the night.

A further aspect of the present invention is the storage apparatus, further comprising a progress managing part that manages a progress of shredding of each of the storage media, based on an execution result of the storage medium write request registered into the process wait queue by the erase data write request generating part, and outputs the progress of each of the storage media.

Other problems disclosed in the present application and the methods for solving the problem will be apparent from the section "Description of Embodiments" and the drawings.

Advantageous Effects of Invention

According to the present invention, efficient shredding of the storage medium for use in the storage apparatus can be achieved.

BRIEF DESCRIPTION OF DRAWINGS

FIG. 1 is a block diagram showing a configuration of a storage system 1.

FIG. 2A is a block diagram showing a hardware configuration of a communication I/F 11.

FIG. 2B is a block diagram showing a hardware configuration of a control processor 12.

FIG. 2C is a block diagram showing a hardware configuration of a drive controller 13.

FIG. 3 is a block diagram showing an example of a computer (or an information processing apparatus) available for use as a management device 3.

FIG. 4 is a block diagram showing another aspect (or configuration) of a storage apparatus.

FIG. 5 is a block diagram showing main functions included in the management device 3.

FIG. 6 is a block diagram showing main functions and main data included in a storage apparatus 10.

FIG. 7 is a diagram showing a data structure of a drive write request.

FIG. 8A is a table showing an example of a load information table 634.

FIG. 8B is a table showing an example of an execution condition table 633.

FIG. 9 is a schematic diagram of assistance in explaining the data length of erase data.

FIG. 10 is a table showing an example of a drive information table 631.

FIG. 11 is a state transition diagram 1100 of the execution state of an erase data write request registration process.

FIG. 12 is a table showing an example of a shredding information table 632.

FIG. 13 is a flowchart of assistance in explaining a data write process S1300:

FIG. 14 is a flowchart of assistance in explaining an I/O request queuing process S1400.

FIG. 15 is a table showing an example of a write process wait queue 1500.

FIG. 16 is a flowchart of assistance in explaining a drive write process S1600.

FIG. 17 is a flowchart of assistance in explaining a data read process S1700, FIG. 18A is a flowchart of assistance in explaining a configuration setting process S1800.

FIG. 18B is an illustration showing an example of a configuration setting screen 1850.

FIG. 19 is a flowchart of assistance in explaining a shredding process S1900.

FIG. 20A is a flowchart of assistance in explaining an information display process S2000.

FIG. 20B is an illustration showing an example of an information display screen 2050.

DESCRIPTION OF EMBODIMENTS

An embodiment of the present invention will be described below. FIG. 1 shows the configuration of a storage system 1 as described by way of the embodiment. As shown in FIG. 1, the storage system 1 is configured by including a host computer 2 (or an external apparatus), a storage apparatus 10 that communicates with the host computer 2 via a communication network 5, and a management device 3 communicatively coupled to the storage apparatus 10 via a LAN (local area network) or the like.

The communication network 5 is, for example, a LAN, a SAN (storage area network), the Internet, a public communication network, or the like. Communication between the host computer 2 and the storage apparatus 10 takes place according to a protocol such as TCP/IP, iSCSI (internet small computer ystem interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark).

The host computer 2 is an information processing apparatus (or a computer) that utilizes a storage area provided by the storage apparatus 10. The host computer 2 is configured for example by using hardware such as a personal computer, a mainframe, or an office computer. When accessing the above-mentioned storage area, the host computer 2 sends a data I/O request to the storage apparatus 10.

The storage apparatus 10 includes at least one communication interface (hereinafter denoted as a communication I/F 11), at least one control processor 12 (or microprocessor), at least one drive controller 13 (or storage medium controller), a cache memory 14, a shared memory 15, an internal switch 16, a storage device 17, and a service processor 18. Of these, the communication I/F 11, the control processor 12, the drive controller 13, the cache memory 14, and the shared memory 15 are communicatively coupled to one another via the internal switch 16.

The communication I/F 11 receives the data I/O request (such as a data write request or a data read request) sent from the host computer 2, and sends a response on processing performed for the received data I/O request (such as read data, read completion information, or write completion information) back to the host computer 2. The communication I/F 11 has a function for protocol control for communication with the host computer 2.

The control processor 12 performs processing for data transfer from one to another of the communication I/F 11, the drive controller 13, and the cache memory 14, in response to the data I/O request received by the communication I/F 11. The control processor 12 performs the delivery of data (i.e., data read from the storage device 17 or data to be written to the storage device 17) from one to another of the communication I/F 11 and the drive controller 13 for example via the cache memory 14, or performs staging (i.e., the reading of data from the storage device 17) or destaging (i.e., the writing of data to the storage device 17) data stored in the cache memory 14.

The cache memory 14 is configured for example by using RAM (random access memory) capable of quick access. The cache memory 14 stores the data to be written to the storage device 17 (hereinafter referred to as "write data") or the data read from the storage device 17 (hereinafter described as "read data"). The shared memory 15 stores various kinds of information for use in control of the storage apparatus 10.

The drive controller 13 performs communication with the storage device 17, for the reading of data from the storage device 17 or the writing of data to the storage device 17. The internal switch 16 is configured for example by using a high speed crossbar switch. Communication through the internal switch 16 is performed according to Fibre Channel Protocol, iSCSI protocol, TCP/IP, or other protocols.

The storage device 17 is configured by including a plurality of storage media (such as hard disk drives or semiconductor memories (or SSDs (solid-state drives))). The storage device 17 will be hereinafter described as being configured with the use of a hard disk drive, for example, of SAS (Serial Attached SCSI), SATA (Serial ATA), FC (Fibre Channel), PATA (Parallel ATA) or SCSI type and the like, or a semiconductor memory (SSD) (hereinafter, storage media such as a hard disk drive and a semiconductor memory are referred collectively to as storage drive 171).

The storage device 17 provides a storage area having as a unit a logical device 172 (LDEV) configured for example by using a storage area (e.g., a storage area belonging to a RAID group (or a parity group)) provided by the storage drive 171 being controlled by a control method such as the RAID (redundant array of inexpensive (or independent) disks) method. Incidentally, the unit of the storage area provided by the storage device 17 is not limited to the above-mentioned logical device (LDEV).

FIG. 2A shows a hardware configuration of the communication I/F 11. The communication I/F 11 includes an external communication interface (hereinafter denoted as an external communication I/F 111), a processor 112, a memory 113, an internal communication interface (hereinafter denoted as an internal communication I/F 114), and a timer 115. The external communication I/F 111 is a NIC (network interface card) or an HBA (host bus adapter), for example. The processor 112 is a CPU (central processing unit), an MPU (micro processing unit), or the like. The memory 113 is RAM or ROM (read only memory). The internal communication I/F 114 performs communications with the control processor 12, the drive controller 13, the cache memory 14, and the shared memory 15, through the internal switch 16. The timer 115 is configured for example by using an RTC (real time clock), thereby to supply information about time such as the present date and time.

FIG. 2B shows a hardware configuration of the control processor 12. The control processor 12 includes an internal communication interface (hereinafter denoted as an internal communication I/F 121), a processor 122, a memory 123, and a timer 124. The internal communication I/F 121 performs communications with the communication I/F 11, the drive controller 13, the cache memory 14, and the shared memory 15, through the internal switch 16. The processor 122 is a CPU, an MPU, a DMA (direct memory access), or the like. The memory 123 is a RAM or a ROM. The timer 124 is configured for example by using an RTC (real time clock), thereby to supply information about time such as the present date and time.

FIG. 2C shows a hardware configuration of the drive controller 13. The drive controller 13 includes an internal communication interface (hereinafter denoted as an internal communication I/F 131), a processor 132, a memory 133, and a drive interface (hereinafter denoted as a drive I/F 134). The internal communication I/F 131 communicates with the communication I/F 11, the control processor 12, the cache memory 14, the shared memory 15, and on the like, through the internal switch 16. The processor 132 is a CPU, an MPU, or the like. The memory 133 is a RAM or a ROM. The drive I/F 134 performs communication with the storage device 17.

The service processor 18 (SVP) is a computer including a CPU and a memory. The service processor 18 controls structural components of the storage apparatus 10 and monitors the statuses of the structural components. The service processor 18 communicates with the structural components, such as the communication I/F 11, the control processor 12, the drive controller 13, the cache memory 14, the shared memory 15, and the internal switch 16, through the internal switch 16 or through a communication means such as a LAN. The service processor 18 acquires performance information or the like from the structural components of the storage apparatus 10 whenever necessary, and provides the information to the management device 3. The service processor 18, for example, sets, controls and maintains the structural components (e.g., installs or updates software), and the like, in accordance with information sent from the management device 3.

FIG. 3 shows an example of a computer (or an information processing apparatus) available for use as the management device 3. As shown in FIG. 3, a computer 30 includes a CPU 31, a volatile or a nonvolatile memory 32 (RAM or ROM), a storage device 33 (for example, a hard disk drive or semiconductor memory (SSD)), an input device 34 such as a keyboard or a mouse, an output device 35 such as a liquid crystal display monitor or printer, and a communication interface (denoted as a communication I/F 36) such as an NIC or an HBA. The management device 3 is a personal computer or an office computer, for example. The management device 3 may be integral with the storage apparatus 10 (or may be mounted on the same chassis as that for the storage apparatus 10). The management device 3 is communicatively coupled to the service processor 18 via the LAN or the like. The management device 3 includes a user interface using a GUI (graphical user interface), a CLI (command line interface), or the like, for control or monitoring of the storage apparatus 10.

FIG. 4 shows another aspect of the storage apparatus 10. As shown in FIG. 4, the storage apparatus 10 includes a basic chassis 101 mounting therein a redundant configuration of a plurality of controller boards 40, and an expanded chassis 102 mounting the storage drive 171 for expansion, without the controller board 40.

The controller board 40 includes a communication I/F 41, a data controller 42 (DCTL), a drive I/F 43 (or a storage medium controller), a cache memory 44 (CM), a bridge 45, a CPU 46, a memory 47, and a switch 48. The controller board 40 has the same functions as those implemented by the communication I/F 11, the control processor 12 and the drive controller 13 of the storage apparatus 10 shown in FIG. 1.

The storage drives 171 built in the basic chassis 101 and the expanded chassis 102, respectively, are coupled to the controller boards 40 via, for example, a Fibre Channel loop 106. The controller boards 40 are coupled via an internal communication path 105. The redundant configuration of the plurality of controller boards 40 may be used to form a failover cluster.

<Functions of the Management Device>

FIG. 5 shows the main functions of the management device 3. As shown in FIG. 5, the management device 3 includes a shredding managing part 510 for management of functions for data shredding (hereinafter referred to as "shredding") of the storage drive 171 included in the storage apparatus 10. As shown in FIG. 5, the shredding managing part 510 includes a configuration setting part 511 and an information display part 512. Incidentally, these functions included in the management device 3 are implemented by hardware included in the management device 3, or by a program stored in the memory 32 being read and executed by the CPU 31 of the management device 3.

The configuration setting part 511 receives the hard disk drive 171 targeted for the shredding (hereinafter referred to as a "target drive"), accepts a shredding method, and accepts a shredding execution condition. Also, the configuration setting part 511 transmits these received pieces of information (i.e., the target drive, the shredding method, and the shredding execution condition) to the storage apparatus 10, and also transmits an instruction to start the execution of the shredding for the target drive to the storage apparatus 10. The information display part 512 provides display of information on the shredding, such as display of the status of the shredding being executed or the result of the execution.

The above-mentioned shredding method refers to information indicative of an aspect of the shredding. The shredding methods include the NSA (National Security Agency) method, the Peter Gutmann method, and the German BSI (German Information Security Agency) method.

The above-mentioned shredding execution condition is information for controlling the execution of the shredding. The shredding execution conditions include, for example, the threshold of load on the storage apparatus 10 (such as the utilization of the processor 112 of the communication I/F 11, the utilization of the processor 122 of the control processor 12, or the utilization of the processor 132 of the drive controller 13) (hereinafter referred to as a "load threshold"), the threshold of capacity remaining in the cache memory 14 (hereinafter referred to as a "cache remaining-capacity threshold"), the threshold of power consumption by the storage system 1 or power consumption by the storage apparatus 10 (hereinafter referred to as a "power consumption threshold"), and a time period during which the execution of the shredding is inhibited (hereinafter referred to as an "execution inhibition time period").

<Functions of the Storage Apparatus>

FIG. 6 shows the main functions included in the storage apparatus 10, and main data managed in the storage apparatus 10. As shown in FIG. 6, the storage apparatus 10 includes a write processing part 611 and a read processing part 612. In addition to these functions, the storage apparatus 10 also includes a load information acquisition part 613 that acquires information on the load on the storage apparatus 10 (hereinafter referred to as "load information"), and a shredding processing part 620 that performs a process for the shredding of the storage drive 171 (hereinafter referred to as a "shredding process").

As shown in FIG. 6, the shredding processing part 620 includes an erase data generating part 621, an erase data write request generating part 622, an execution state controlling part 623, and a progress managing part 624. Incidentally, these functions included in the storage apparatus 10 are implemented by a program, stored in the memory 113 or the storage device 17, being read and executed by the processor 112 of the communication I/F 11, the processor 122 of the control processor 12, or the processor 132 of the drive controller 13.

As shown in FIG. 6, the storage apparatus 10 also stores a drive information table 631, a shredding information table 632, an execution condition table 633, and a load information table 634. Of these, the drive information table 631 stores information on the storage drive 171 that configures the storage device 17. The shredding information table 632 manages information indicative of the progress of the shredding process, or the like. And the execution condition table 633 manages the shredding execution condition transmitted from the management device 3. The load information table 634 manages the load information acquired by the load information acquisition part 613.

Upon receipt of the data write request as the data I/O request from the host computer 2, the write processing part 611 of the storage apparatus 10 generates a write request (hereinafter referred to as a "drive write request (or storage medium write request)") to the storage drive 171 for the received data I/O request, and registers the drive write request into a write process wait queue 1500 (to be described later) managed by the drive controller 13. The drive controller 13 acquires the drive write requests in sequential order from the write process wait queue 1500, and writes data to the storage device 17 according to the acquired drive write request. On the other hand, upon receipt of the data read request as the data I/O request from the host computer 2, the read processing part 612 of the storage apparatus 10 reads data from the storage device 17, and transmits the data read from the storage device 17 (or the read data) to the host computer 2.

FIG. 7 shows a data structure of the drive write request. As shown in FIG. 7, a drive write request 700 is configured by containing respective fields for a drive ID 711, a write destination address 712, a data length 713, and a cache storage position 714. The identifier (hereinafter referred to as the "drive ID") of the storage drive 171 for which data (hereinafter referred to as "drive write data") to be written by the drive write request 700 is destined is set in the drive ID 711 of the above-mentioned fields. The write location (for example, an LBA (logical block address)) of the drive write data on the storage drive 171 of destination is set in the write destination address 712. The data size of the drive write data is set in the data length 713. The storage location of the drive write data on the cache memory 14 is set in the cache storage position 714.

The load information acquisition part 613 acquires the load information, and the load information table 634 manages the acquired load information. FIG. 8A shows an example of the load information table 634. As shown in FIG. 8A, the load information table 634 manages utilization 6341 of the respective processors (i.e., the processor 112, the processor 122 and the processor 132) of the communication I/F 11, the control processor 12 and the drive controller 13, remaining capacity 6342 of the cache memory 14, and power consumption 6343 by the storage apparatus 10.

The contents of the load information table 634 are compared to those of the execution condition table 633. FIG. 8B shows an example of the execution condition table 633. As shown in FIG. 8B, the execution condition table 633 manages an upper threshold 6331 of the utilization of each of the respective processors of the communication I/F 11, the control processor 12 and the drive controller 13 (i.e., the processor 112 of the communication I/F 11, the processor 122 of the control processor 12, and the processor 132 of the drive controller 13), a threshold 6332 of the remaining capacity of the cache memory 14, and an upper threshold 6333 of the power consumption by the storage apparatus 10. In addition to these, the execution condition table 633 also manages an execution inhibition time period 6334 as the shredding execution condition for comparison with the present time.

The erase data generating part 621 generates data (hereinafter referred to as "erase data") to be written to the target drive at the time of the execution of the shredding according to the shredding method specified by the management device 3, and stores the generated erase data into the cache memory 14. Incidentally, the contents of the erase data are determined according to the shredding method previously mentioned. Also, the data size of the erase data generated is set to a sector length of the target drive (or an integral multiple of the sector length), which is a data size that can be handled with a command transmitted by the drive controller 13.

As shown in FIG. 9, the erase data generating part 621 generates erase data having a data length of 520 bytes, if the target drive (or every specified target drive if a plurality of target drives is specified) is of the SCSI, FC or SAS type. Also, the erase data generating part 621 generates erase data having a data length of 512 bytes, for example if the target drive (or every specified target drive if a plurality of target drives is specified) is a hard disk drive of the PATA or SATA type. On the other hand, if a plurality of target drives of different sector lengths is specified, the erase data generating parts 621 generates erase data having a data length equal to the least common multiple of the sector length of each type of target drive or an integral multiple of the least common multiple.

For erase data generation, the erase data generating part 621 refers to the drive information table 631. FIG. 10 shows an example of the drive information table 631. As shown in FIG. 10, the drive information table 631 is configured by including a plurality of records composed of fields for a drive ID 6311 in which the drive ID is set, a drive type 6312 in which the drive type (such as the SCSI, FC, SAS, PATA or SATA type) is set, a sector length 6313 in which the sector length of the set drive is set, a capacity 6314 in which the capacity of the set drive is set, and on the like. The drive ID is set in the drive ID 6311.

The erase data write request generating part 622 generates a drive write request (hereinafter referred to as an "erase data write request") to write the erase data, as the data to be written to the target drive according to the shredding method, to the target drive, and sends the generated request to the drive controller 13. Incidentally, the data structure of the erase data write request is the same as that of the drive write request 700 shown in FIG. 7. The erase data write request generating part 622 sets the storage location (or address) of the erase data generated by the erase data generating part 621, on the cache memory 14, in the cache storage position 714 of the erase data write request.

The execution state controlling part 623 shown in FIG. 6 controls the execution state of a process for registering the erase data write request (hereinafter referred to as an "erase data write request registration process"), which is performed by the erase data write request generating part 622. FIG. 11 shows a state transition diagram 1100 of the execution state of the erase data write request registration process. As shown in FIG. 11, the execution states of the erase data write request registration process include three states: a completely executed state 1111, a partially executed state 1112, and a stopped state 1113. In the completely executed state 1111 of these states, the erase data write request registration process is performed with no particular restriction. In the partially executed state 1112, the erase data write request registration process is restricted in its execution. The number of erase data write requests that may be registered into the write process wait queue 1500 per unit time, for example, is limited. Also, the number of target drives to be concurrently shredded is limited. In the stopped state 1113, the erase data write request registration process is completely stopped.

The execution state controlling part 623 controls the execution state of the erase data write request registration process, depending on the load on the storage apparatus 10, the remaining capacity of the cache memory 14, the power consumption by the storage system 1 or the storage apparatus 10, or the like, previously mentioned. For example if, when the erase data write request registration process is being performed in the completely executed state 1111, the load on the storage apparatus 10 becomes equal to or more than the load threshold or the remaining capacity of the cache memory 14 becomes equal to or less than the cache remaining-capacity threshold, the execution state controller 623 causes the execution state to transit to the partially executed state 1112. Also, when approaching the execution inhibition time during the execution of the erase data write request registration process in the completely executed state 1111 or the partially executed state 1112, the execution state controlling part 623 switches the execution state of the erase data write request registration process to the stopped state 1113.

The progress managing part 624 acquires the progress of the shredding process of each target drive, and sends notification of the acquired progress to the management device 3. The progress managing part 624 manages the acquired progress in the shredding information table 632. FIG. 12 shows an example of the shredding information table 632. As shown in FIG. 12, the shredding information table 632 is configured of at least one record composed of fields for a drive ID 6321, start time 6322, a status 6323, error information 6324, finish time 6325 and or the like.

The drive ID of the target drive is set in the drive ID 6321 of the shredding information table 632. The date and time at which the shredding process of the target drive has been started is set in the start time 6322. The execution status of the shredding process of the target drive is set in the status 6323. Incidentally, the progress managing part 624 manages the status (or the complete or incomplete status) of the writing of the erase data to the target drive, on a sector basis, and generates the contents of the status 6323, based on this information. The address (such as the LBA) of a sector on which faulty writing (or a writing failure) such as a write error, or the like, has occurred at the time of the writing of the erase data is set in the error information 6324. The date and time at which a pattern write process has been finished is set in the finish time 6325.

=Description of Processing=

Description will now be given with regard to processing performed by the management device 3 or the storage apparatus 10. First, description will be given with regard to a basic function of the storage apparatus 10.

<Data Write Process>

FIG. 13 is a flowchart of assistance in explaining a process (hereinafter referred to as a "data write process S1300") which the write processing part 611 performs when the storage apparatus 10 receives the data write request as the aforementioned I/O request from the host computer 2. The data write process S1300 will be described below in connection with FIG. 13.

The data write request sent from the host computer 2 is received by the communication I/F 11 of the storage apparatus 10 (S1311, S1312). Upon receipt of the data write request from the host computer 2, the communication I/F 11 sends notification of the receipt of the data write request to the control processor 12 and the drive controller 13 (S1313). The communication I/F 11 transmits completion information to the host computer 2 (S1314), and the host computer 2 receives the transmitted completion information (S1315).

Upon receipt of the above-mentioned notification from the communication I/F 11 (S1321), the control processor 12 generates the drive write request 700 based on the data write request and stores the drive write request 700 in the cache memory 14, and also transmits the generated drive write request 700 to the drive controller 13 (S1322, S1323).

Upon receipt of the drive write request 700, the drive controller 13 registers the drive write request 700 into the write process wait queue 1500 (S1324). The drive controller 13 reads the drive write request 700 from the write process wait queue 1500 whenever necessary (S1325). Then, the drive controller 13 reads drive write data specified by the drive write request 700 that was read, from the cache memory 14, and writes the drive write data that was read, to the storage drive 171 (S1326).

Then, the drive controller 13 executes a process for verifying whether or not the write data has been correctly written to the storage device 17 (hereinafter referred to as a "verification process S1327") (S1327). Details of the verification process S1327 will be described later. Upon completion of the verification process S1327, the drive controller 13 transmits notification (or completion notification) that the writing of the drive write data for the drive write request has been completed, to the control processor 12 (S1328). The control processor 12 receives the transmitted completion notification (S1329).

FIG. 14 is a flowchart of assistance in explaining a process which, in S1324 of FIG. 13, the drive controller 13 performs at the time of the receipt of the drive write request (hereinafter referred to as an "I/O request queuing process S1400"). The I/O request queuing process S1400 will be described below in connection with FIG. 14.

The drive controller 13 waits for the drive write request to be sent from the control processor 12 (S1411: NO). Upon receipt of the drive write request (S1411: YES), the drive controller 13 registers the received drive write request into the write process wait queue 1500 (S1412). FIG. 15 shows an example of the write process wait queue 1500.

FIG. 16 is a flowchart of assistance in explaining a process for writing the write data to the storage drive 171 (hereinafter referred to as a "drive write process S1600"), which is performed in S1325 to S1328 of FIG. 13. The drive controller 13 performs real-time monitoring to determine whether or not the unprocessed drive write request 700 is present in the write process wait queue 1500 (S1611: NO). If the unprocessed drive write request 700 is present in the write process wait queue 1500 (S1611: YES), the drive controller 13 reads the drive write request 700 from the write process wait queue 1500 (S1612), and transmits a command to write the drive write data to the storage drive 171 set in the drive ID 711 of the read drive write request 700 (hereinafter referred to as a "write command") (S1613).

After the transmission of the write command, the drive controller 13 waits for notification of completion from the transmission target storage drive 171 (S1614: NO). If the notification of the completion is received (S1614: YES), the processing proceeds to S1615.

At S1615, the drive controller 13 transmits to the storage drive 171 a command to read the data from the write destination for the latest write data. Incidentally, when the storage drive is a hard disk drive, prior to the transmission of this command, a seek command for calibration of the position of a head of the hard disk drive may be transmitted to the hard disk drive.

Then, the drive controller 13 waits for the read data for the command to be sent (S1616: NO). Upon receipt of the read data (S1616: YES), the drive controller 13 performs a comparison between the received read data and the latest write data acquired from the cache memory 14 thereby to determine whether or not their contents match (S1617). Then, the drive controller 13 transmits to the control processor 12 the result of the comparison in conjunction with completion notification on the latest data write request (S1618). Thereafter, the processing returns to S1611. Incidentally, the processing of S1615 to S1617 corresponds to the verification process S1327 shown in FIG. 13.

<Data Read Process>

FIG. 17 is a flowchart of assistance in explaining a process (hereinafter referred to as a "data read process S1700") which the read processor 612 of the storage apparatus 10 performs when the storage apparatus 10 receives the data read request as the aforementioned I/O request from the host computer 2. The data read process S1700 will be described below in connection with FIG. 17.

The data read request sent from the host computer 2 is received by the communication I/F 11 of the storage apparatus 10 (S1711, S1712). Upon receipt of the data read request from the host computer 2, the communication I/F 11 sends notification of the receipt of the data read request to the control processor 12 and the drive controller 13 (S1713).

Upon receipt of the above-mentioned notification from the communication I/F 11, the drive controller 13 reads data specified by the data read request (for example, data addressed by the LBA) from the storage device 17 (or the storage drive 171) (S1714). Incidentally, if read data is present in the cache memory 14 (or if there is a cache hit), the read process of data from the storage device 17 (S1714) is omitted. The control processor 12 writes the data read by the drive controller 13 to the cache memory 14 (S1715). The control processor 12 transfers the data written to the cache memory 14 to the communication I/F 11 whenever necessary (S1716).

The communication I/F 11 transmits the read data sent from the control processor 12, in sequential order, to the host computer 2 (S1717, S1718). Upon completion of the transmission of the read data, the communication I/F 11 transmits completion notification to the host computer 2 (S1719). The host computer 2 receives the transmitted completion notification (S1720).

=Processing Involved in Shredding=

Description will now be given with regard to processing involved in the shredding of the storage drive 171, which is performed by the management device 3 and the storage apparatus 10.

<Configuration Setting Process>

FIG. 18A is a flowchart of assistance in explaining a process (hereinafter referred to as a "configuration setting process S1800") which the configuration setting part 511 of the management device 3 performs at the time of the shredding of the storage drive 171. The configuration setting process S1800 will be described below in connection with FIG. 18A.

First, the configuration setting part 511 displays a screen shown in FIG. 18B (hereinafter referred to as a "configuration setting screen 1850") on the management device 3, and receives the drive 1D of the target drive which a user is intending to shred, the shredding method, and the shredding execution condition (S1811 to S1813). If the user gives the management device 3 an instruction to start the shredding (S1814:YES), the configuration setting part 511 transmits the received drive ID, shredding method and shredding execution condition, in conjunction with the instruction to start the shredding, to the storage apparatus 10 (S1815).

<Shredding Process>

FIG. 19 is a flowchart of assistance in explaining a shredding process (hereinafter referred to as a "shredding process S1900") which the shredding processing part 620 of the storage apparatus 10 performs when the instruction to start the shredding is sent from the management device 3. The shredding process S1900 will be described below in connection with FIG. 19.

Upon receipt of the instruction to start the shredding from the management device 3 (S1911: YES), first, the erase data generating part 621 of the shredding processing part 620 generates erase data according to the shredding method received in conjunction with the instruction to start the shredding, and stores the generated erase data in the cache memory 14 (S1912).

Here, at the time of the erase data generation, the erase data generating part 621 generates only common erase data for all target drives and stores the generated erase data in the cache memory 14, if the number of drive IDs received in conjunction with the instruction to start the shredding is two or more (or the number of target drives is two or more) and all target drives are of the same sector length as well. Also, if the number of received drive IDs is two or more and also target drives of different sector lengths coexist together, data having a data length equal to the least common multiple of each sector length or an integral multiple of the least common multiple is generated as common erase data used for all target drives, then the generated data is stored in the cache memory 14.

Then, the shredding processing part 620 acquires the load information on the storage apparatus 10 from the load information table 634 (S1921). Also, the present time is acquired from the timer 124 (or the timer 115) (S1922).

Then, the shredding processing part 620 performs a comparison between the acquired load information or present date and time, and the shredding execution condition received at S1911 in conjunction with an instruction to start the shredding, thereby to determine whether or not the erase data write request registration process is executable (S1923). If it is judged that the registration process is not executable (S1923: NO), transition of the execution state of the erase data write request registration process to a stopped state 1113 is performed by the execution state controlling part 623, and after that, the processing returns to S1921. For example if the present time lies within the execution inhibition time period, the registration process is judged as not being executable. If it is judged that the registration process is executable (S1923: YES), the processing proceeds to S1924.

At S1924, the shredding processing part 620 performs a comparison between the acquired load information or present date and time and the shredding execution condition acquired at S1911, thereby to determine the execution state of the erase data write request registration process (i.e., the completely executed state 1111 or the partially executed state 1112), so that the erase data write request registration process undergoes a transition to the determined execution state to be started.

First, the shredding processing part 620 generates the erase data write request to be sent to the target drive identified by the drive ID acquired from the management device 3 (S1925). At this time, the shredding processing part 620 generates the number of erase data write requests depending on the current execution state. For example if the current execution state is the partially executed state 1112, the shredding processing part 620 generates only the erase data write request for a part of the target drives specified by the drive IDs received from the management device 3. Incidentally, the storage location of the erase data stored in the cache memory 14 at S1912, on the cache memory 14, is set in the cache storage position 714 of the erase data write request generated at this time.

Also, for the generation of the erase data write request, the shredding processing part 620 uses the common erase data stored in the cache memory 14 at S1912. Specifically, for the generation of the erase data write request for a plurality of target drives, the storage location of the common erase data stored in the cache memory 14, on the cache memory 14, is stored in the cache storage position 714 of the erase data write request.

As mentioned above, even if a plurality of erase data write requests for different target drives are generated for concurrent shredding, the erase data generating part 621 generates only the common erase data for use, which in turn enables to suppress the erase data generation load for the shredding. Also, low utilization of the cache memory 14 enables lessening the influence on normal operation (i.e., the processing of the data I/O request received from the host computer 2).

Also, if drives of different sector lengths coexist together in the target drive, the erase data generating part 621 generates the data having a data length equal to the least common multiple of each sector length or an integral multiple of the least common multiple, as the common erase data used for all target drives, and stores the generated data in the cache memory 14. Even if the concurrent shredding of the target drives of different sector lengths is performed as mentioned above, the use of the common erase data stored in the cache memory 14 enables to achieve the same effect as described above.

Then, the shredding processing part 620 registers the generated erase data write request into the write process wait queue 1500 (S1926). After the registration of the erase data write request into the write process wait queue 1500, the shredding processing part 620 waits for completion notification for the registered erase data write request to be sent from the target drive (or waits for the completion notification transmitted at S1328 of FIG. 13).

Here, the erase data write request registered into the write process wait queue 1500 is processed according to the drive write process S1600 shown in FIG. 16. Specifically, the drive controller 13 reads the erase data write requests registered into the write process wait queue 1500, in sequential order, and transmits the write command to write erase data to the target drive according to the erase data write request that is read (S1611 to S1613). Then, upon receipt of the notification of completion from the target drive, the drive controller 13 executes the aforementioned verification process S1327 (S1615 to S1617), and transmits to the control processor 12 the completion notification in conjunction with the result of the comparison (S1618).

As mentioned above, the storage apparatus 10 according to the present embodiment uses a verification function for processing the drive write request for the typical data write request sent from the host computer 2, thereby to verify whether or not the erase data write request has been properly performed. This enables to achieve the verification function for the erase data write request (i.e., the verification function for the shredding process) without the need of providing a specifically designed device.

Upon receipt of the completion notification from the drive controller 13 (S1927: YES), the shredding processing part 620 updates the shredding information table 632, based on the result of the comparison transmitted in conjunction with the completion notification (S1928).

Then, the shredding processing part 620 judges whether or not the target drive for which the shredding has been completed is present (S1929). Incidentally, determining whether or not the shredding has been completed for the target drive is accomplished for example by judging whether or not the value of the write destination address 712 set in the latest erase data write request is the address of the last sector of the target drive for the erase data write request. If the target drive for which the shredding has been completed is present (S1929: YES), the shredding processing part 620 sets the present time (i.e., the finish time) in the finish time 6325 of the target drive in the shredding information table 632 (S1930). If the target drive for which the shredding has been completed is not present (S1929: NO), the processing proceeds to S1931.

At S1931, the shredding processing part 620 judges whether or not the shredding has been completed for all target drives. If the shredding is not completed (S1931: NO), the processing returns to S1921. If the shredding is completed (S1931: YES), the processing is terminated.

As described above, if a plurality of target drives is transmitted from the management device 3, a plurality of erase data write requests for each of the target drives is registered into and managed in the write process wait queue 1500. This enables the concurrent shredding of different target drives (i.e., concurrent processing using time division multiplexing), and thus enables efficient shredding of the plurality of storage drives 171.

<Information Display Process>

FIG. 20A is a flowchart of assistance in explaining a process, which is performed by the information display part 512 of the management device 3 (hereinafter referred to as an "information display process S2000"). The information display process S2000 will be described below in connection with FIG. 20A.

Upon receipt of a request to display shredding information from the user (S2011: YES), the information display part 512 accesses the storage apparatus 10 to acquire the contents of the shredding information table 632 (S2012). Then, the information display part 512 displays the acquired contents on the management device 3 (S2013).

FIG. 20B shows an example of a screen displayed on the management device 3 by the information display part 512 (hereinafter referred to as an "information display screen 2050"). As shown in FIG. 20B, the information display screen 2050 displays information on the progress of the shredding of each target drive, such as start time 2052 of the shredding process, progress 2053, expected finish time 2054, sector number of a sector on which a writing failure has occurred (i.e., error information 2055), and finish time 2056 of the shredding, for each target drive (or drive ID 2051). Incidentally, the contents of the expected finish time 2054 of the information display screen 2050 are determined for example by adding the remaining time determined by the following equation to the value of the start time 2052. By referring to the information display screen 2050, the user can easily see the progress of such as the shredding of each of the target drives being concurrently shredded.

The remaining time=((the present time—the start time of the process)×(the sector number of the last sector–the sector number of the last processed sector))/the sector number of the last processed sector While the embodiment of the present invention has been described, it is to be understood that the above embodiment is for the purpose of facilitating the understanding of the invention and not for the purpose of restrictively construing the invention. Changes and modifications may be made thereto without departing from the spirit and scope of the invention and equivalents thereof are included in the invention.

The invention claimed is:

1. A storage apparatus comprising:
   a communication I/F that receives a data I/O request sent from an external apparatus;
   a storage medium controller that performs any one of writing and reading of data to and from a storage device configured to include a plurality of storage media, in response to the received data I/O request;
   a cache memory that stores any one of write data to be written to the storage device and read data read from the storage device;
   a control processor that serves for data transfer performed between at least one to another of the communication I/F, the storage medium controller, and the cache memory;
   an erase data generating part; and
   an erase data write request generating part, wherein
   the storage medium controller manages in a process wait queue a storage medium write request as a request to write the write data to the storage medium, reads the storage medium write request registered on the process wait queue, and writes the data to the storage medium in accordance with the storage medium write request that is read,
   the erase data generating part generates erase data as data to be written to the storage medium in order to shred the storage medium, and stores the generated erase data in the cache memory, and
   the erase data write request generating part generates a plurality of the storage medium write requests to write the erase data to the storage media, intended for the different storage media, respectively, and registers the generated storage medium write requests into the process wait queue.

2. The storage apparatus according to claim 1, wherein the erase data write request generating part uses in common the same erase data stored in the cache memory, to generate the plurality of storage medium write requests.

3. The storage apparatus according to claim 2, wherein the erase data generating part generates the erase data having a data length equal to any one of a least common multiple of sector lengths of the respective storage media and an integral multiple of the least common multiple to store in the cache memory, when the plurality of storage medium write requests to be generated by the erase data write request generating part includes a mixture of the requests intended for the storage media of different sector lengths.

4. The storage apparatus according to claim 1, wherein the storage medium is a hard disk drive, and
one of the hard disk drives of different sector lengths is a hard disk drive of at least any one of SCSI, FC and SAS types, having a sector length of 520 bytes, and another is a hard disk drive of at least any one of PATA and SATA types, having a sector length of 512 bytes.

5. The storage apparatus according to claim 1, wherein the storage medium controller further includes a verification function that involves writing first data stored in the cache memory to the storage medium in response to the storage medium write request, and thereafter, reading second data from a write target for the storage medium write request, and comparing the second data to the first data, thereby determining whether or not a write process has been properly performed.

6. The storage apparatus according to claim 1, comprising:
a load information acquisition part that acquires information on a load on the storage apparatus; and
an execution state controlling part that controls a number of the storage medium write requests registered into the process wait queue by the erase data write request generating part, according to the acquired information.

7. The storage apparatus according to claim 6, wherein the information on the load is at least any one of a utilization of a processor of the storage apparatus, a remaining capacity of the cache memory, and a power consumption of the storage apparatus.

8. The storage apparatus according to claim 1, wherein the erase data write request generating part further includes an execution state controlling part that manages a schedule of execution of a process for registering the storage medium write request, and executes the registration process according to the schedule.

9. The storage apparatus according to claim 1, further comprising:
a progress managing part that manages a progress of shredding of each of the storage media, based on an execution result of the storage medium write request registered into the process wait queue by the erase data write request generating part, and outputs the progress of each of the storage media.

10. A method for shredding a storage medium implemented by a storage apparatus including:
a communication I/F that receives a data I/O request sent from an external apparatus;
a storage medium controller that performs any one of writing and reading of data to and from a storage device configured to include a plurality of storage media, in response to the received data I/O request;
a cache memory that stores any one of write data to be written to the storage device and read data read from the storage device; and
a control processor that serves for data transfer performed between at least one to another of the communication I/F, the storage medium controller, and the cache memory, wherein
the storage medium controller manages in a process wait queue a storage medium write request as a request to write the write data to the storage medium, reads the storage medium write request registered on the process wait queue, and writes the data to the storage medium in accordance with the storage medium write request that is read,
the method comprising the steps of:
generating erase data as data to be written to the storage medium in order to shred the storage medium, and storing the generated erase data in the cache memory; and
generating a plurality of storage medium write requests to write the erase data to the storage media, intended for the different storage media, respectively, and registering the generated storage medium write requests into the process wait queue.

11. The method for shredding a storage medium according to claim 10, wherein
the storage apparatus uses in common the same erase data stored in the cache memory, to generate the plurality of storage medium write requests.

12. The method for shredding a storage medium according to claim 11, wherein
the storage apparatus generates the erase data having a data length equal to any one of a least common multiple of sector lengths of storage drives and an integral multiple of the least common multiple to store in the cache memory, when the plurality of storage medium write requests to be generated by the erase data write request generating part includes a mixture of the requests intended for the storage media of different sector lengths.

13. The method for shredding a storage medium according to claim 10, wherein
the storage apparatus writes first data stored in the cache memory to the storage medium in response to the storage medium write request, and thereafter, reads second data from a write target for the storage medium write request, and compares the second data to the first data thereby to determine whether or not a write process has been properly performed.

14. The method for shredding a storage medium according to claim 10, wherein
the storage apparatus acquires information on a load on the storage apparatus, and controls a number of the storage medium write requests registered into the process wait queue by the erase data write request generating part, according to the acquired information.

15. The method for shredding a storage medium according to claim 14, wherein
the information on the load is at least any one of a utilization of a processor of the storage apparatus, a remaining capacity of the cache memory, and a power consumption by the storage apparatus.

* * * * *